(12) United States Patent
Uchida et al.

(10) Patent No.: US 6,219,122 B1
(45) Date of Patent: Apr. 17, 2001

(54) REFLECTIVE LIQUID CRYSTAL DISPLAY DEVICE HAVING BRIGHT LIGHT DISPLAY AND HIGH CONTRAST

(75) Inventors: Tatsuo Uchida, Miyagi-ken; Mitsuo Ohizumi, Fukushima-ken; Mitsuru Kano, Miyagi-ken; Toshiaki Hoshino, Fukushima-ken, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/400,748

(22) Filed: Sep. 22, 1999

(30) Foreign Application Priority Data

Sep. 25, 1998 (JP) .................................................. 10-272300

(51) Int. Cl.$^7$ .................................................. G02F 1/1335
(52) U.S. Cl. .............................. 349/117; 349/99; 349/113; 349/118; 349/121; 252/299.1
(58) Field of Search .............................. 349/117, 99, 113, 349/118, 121; 252/299.1

(56) References Cited

U.S. PATENT DOCUMENTS

| | | | |
|---|---|---|---|
| 5,528,400 | * | 6/1996 | Arakawa ................................ 349/117 |
| 5,548,426 | * | 8/1996 | Miyashita et al. .................... 349/117 |
| 5,793,455 | * | 8/1998 | Nakamura ............................... 349/96 |
| 6,115,095 | * | 9/2000 | Suzuki et al. ......................... 349/117 |
| 6,141,070 | * | 10/2000 | Kaneko ................................ 349/117 |
| 6,144,431 | * | 11/2000 | Yamahara et al. .................... 347/117 |

OTHER PUBLICATIONS

Japanese Unexamined Patent Publication No. 4–289818, 6 pages of English text, 10 pages of text and drawings in Japanese, dated Oct. 14, 1992.

* cited by examiner

Primary Examiner—William L. Sikes
Assistant Examiner—Julie-Huyen L. Ngo
(74) Attorney, Agent, or Firm—Brinks Hofer Gilson & Lione (57) ABSTRACT

In a reflective liquid crystal display device, a retardation $\Delta nd_{LC}$ of a liquid crystal cell ranges from 705 nm to 890 nm. When alignment directions a and b of alignment layers are viewed from the light incident side, and the direction between the alignment directions a and b that bisects the interior angle, which is formed by an intersection of the alignment directions a and b, and the alignment directions a and b, is designated a normal direction X, a retardation $\Delta nd_{RF1}$ of a first retardation film ranges from 195 nm to 280 nm, an angle formed by a delayed phase axis $RF_1$ of the retardation film with respect to the normal direction X ranges from 75° to 115°, counterclockwise, as viewed from the light incident side, a retardation $\Delta nd_{RF2}$ of a second retardation film ranges from 310 nm to 415 nm, an angle formed by a delayed phase axis $RF_2$ of the retardation film with respect to the normal direction X ranges from 130° to 180°, counterclockwise, as viewed from the light incident side, and an angle formed by an absorption axis Pol of a polarizing plate with respect to the normal direction X ranges from 80° to 130° or 170° to 220°, counterclockwise, as viewed from the light incident side.

5 Claims, 8 Drawing Sheets

REFLECTIVE LIQUID CRYSTAL DISPLAY DEVICE HAVING BRIGHT LIGHT DISPLAY AND HIGH CONTRAST

BACKGROUND OF THE INVENTION

1. Field of the Invention

The present invention relates to a reflective liquid crystal display device having a bright light display and high contrast among the characteristics of the bright light display, and, a wide angle of view on the display plane in vertical and horizontal directions, and superior visual characteristics.

2. Description of the Related Art

In general, liquid crystal display devices are either a semi-transmissive or transmissive type having a backlight, or a reflective type. Reflective liquid crystal display devices produce a display without a backlight by using only ambient light, such as sunlight or artificial light, and are widely used in, for example, portable information terminals or the like that need a low profile, light weight, and low power consumption.

Figure 10:
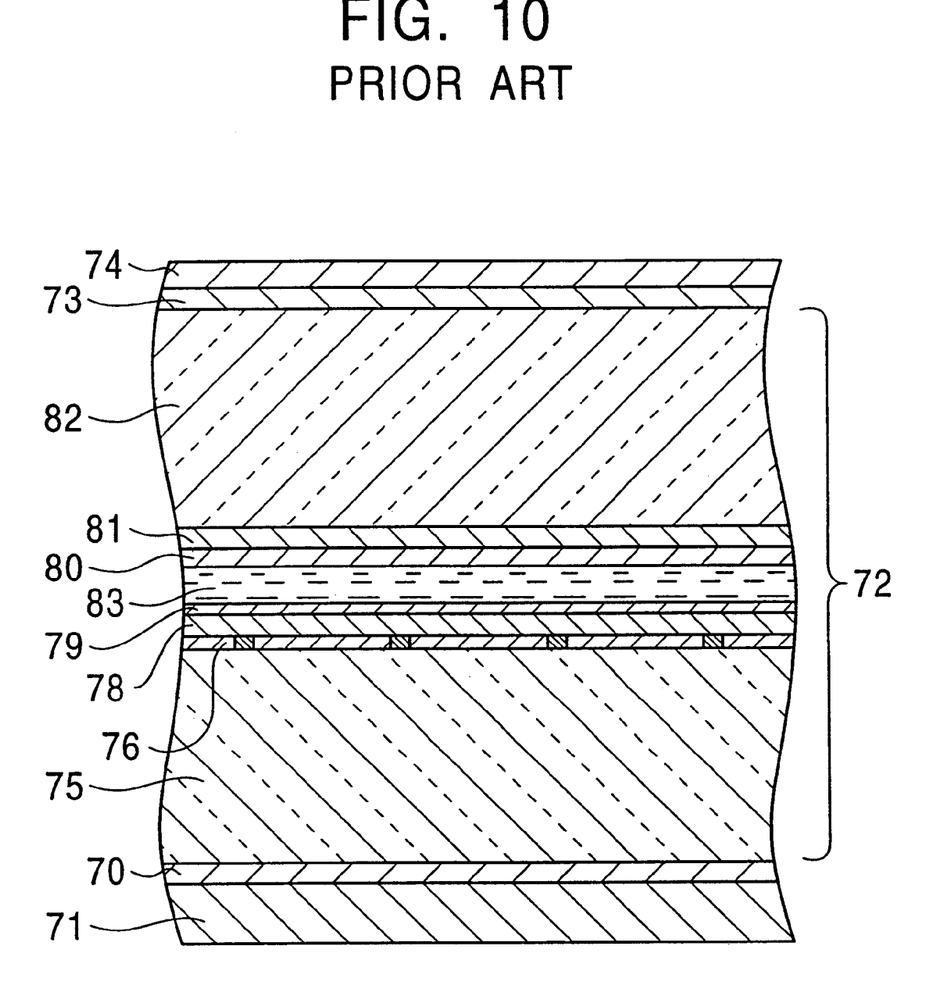
FIG. 10 is a cross-sectional view schematically showing the confirmation of a conventional reflective liquid crystal display device.

FIG. 10 is a schematic cross-sectional view showing the configuration of a well-known type of reflective liquid crystal display device. In particular, the device in this example is a passive-matrix STN (Super-Twisted Nematic) type.

In this reflective liquid crystal display device, a liquid crystal cell 72 for a reflective STN mode and a retardation film 73 are placed in that order on the surface of a lower polarizing plate 70 of a reflection plate 71, and an upper polarizing plate 74 is further placed on the retardation film 73.

In the liquid crystal cell 72, a lower glass substrate 75, a color filter 76, a lower transparent electrode layer 78, a lower alignment layer 79, an upper alignment layer 80 placed opposing the lower alignment layer 79 with a space therebetween, an upper transparent electrode layer 81, and an upper glass substrate 82 are laid in that order on the surface of the lower polarizing plate 70. An STN liquid crystal layer 83 is interposed between the lower and upper alignment layers 79 and 80. An overcoat layer (not shown) made of silica or acrylic resin is provided between the color filter 76 and the lower transparent electrode layer 78.

The retardation film 73 compensates for the phase difference of light passing through the STN liquid crystal, thereby preventing the display from taking on a blue or yellow tint.

The liquid crystal display device is generally required to have high display performance, such as having high resolution, high contrast, a bright screen, vivid colors, high visibility, and a wide angle of view.

When the conventional reflective liquid crystal display device is applied to a display section of a portable information terminal or the like, however, a high-contrast region of the display screen in the horizontal direction is large, whereas a high-contrast region in the vertical direction is small. Therefore, the angle of view on the display screen in the vertical direction is narrow, the dependence on the angle of view is great, and visual characteristics are unsatisfactory. Moreover, light display (white display) is darker than that of a transmissive liquid crystal display device equipped with a high-intensity backlight.

Accordingly, it has been suggested that the white display during the application of a selection voltage be brightened by removing the lower polarizing plate 70 placed between the liquid crystal cell 72 and the reflection plate 71, and by using only the upper polarizing plate 74 on the retardation film 73. In such a reflective liquid crystal display device, however, removing one of the polarizing plates not only brightens the light display, but also brightens the dark display (black display), which results in a loss of contrast.

SUMMARY OF THE INVENTION

The present invention has been made in view of the above circumstances, and an object of the present invention is to provide a reflective liquid crystal display device that having a bright white display and high contrast among the characteristics the of bright white display, a wide angle of view on the display plane in vertical and horizontal directions, and excellent visual characteristics.

In order to achieve the above object, according to an aspect of the present invention, there is provided a reflective liquid crystal display device, wherein a transparent electrode and an alignment layer are placed in that order from the inner side the of transparent substrates on opposite sides of a liquid crystal layer in a liquid crystal cell of a normally black display type, a transparent electrode and an alignment layer are placed in that order from the inner side of the other transparent substrate, and two retardation films and a polarizing plate are placed in that order from the outer side of the other transparent substrate in the liquid crystal cell, wherein a retardation $\Delta nd_{LC}$ of the liquid crystal cell ranges from 705 nm to 890 nm, and wherein, when an alignment direction a of the alignment layer on the side of the other transparent substrate and an alignment direction b of the alignment layer on the side of one of the transparent substrates are viewed from the light incident side, and the direction between the alignment directions a and b that bisects the interior angle, which is formed by an intersection O of the alignment directions a and b, and the alignment directions a and b, is designated a normal direction X, a retardation $\Delta nd_{RF1}$ of the retardation film adjacent to the other transparent substrate ranges from 195 nm to 280 nm, an angle $\phi_{RF1}$ formed by a delayed phase axis of the retardation film with respect to the normal direction X ranges from 75° to 115°, counterclockwise, as viewed from the light incident side, a retardation $\Delta nd_{RF2}$ of the retardation film adjacent to the polarizing plate ranges from 310 nm to 415 nm, an angle $\phi_{RF2}$ formed by a delayed phase axis of the retardation film with respect to the normal direction X ranges from 130° to 180°, counterclockwise, as viewed from the light incident side, and an angle formed by an absorption axis of the polarizing plate with respect to the normal direction X ranges from 80° to 130° or 170° to 220°, counterclockwise, as viewed from the light incident side.

According to the reflective liquid crystal display device of the present invention, in the liquid crystal cell of the normally black display type, the transparent electrode and the alignment layer are placed in that order from the inner side of one of the transparent substrates on opposite sides of the liquid crystal layer, the transparent electrode and the alignment layer are placed in that order from the inner side of the other transparent substrate, and two retardation films and the polarizing plate are placed in that order from the outer side of the other transparent substrate of the liquid crystal cell. Therefore, only a single polarizing plate is used, which makes it possible to improve transmittance in a voltage applied state (when a selection voltage is applied), and to brighten the white display. As a result, the contrast is improved, and excellent display characteristics are obtained.

In particular, $\Delta nd_{LC}$ of the liquid crystal cell ranges from 705 nm to 890 nm, $\Delta nd_{RF1}$ of the retardation film adjacent to the other transparent substrate ranges from 195 nm to 280 nm, and the angle $\phi_{RF1}$ formed by the delayed phase axis of the retardation film with respect to the normal direction X ranges from 75° to 115°, counterclockwise, as viewed from the light incident side. $\Delta nd_{RF2}$ of the retardation film adjacent to the polarizing plate ranges from 310 nm to 415 nm, and the angle $\phi_{RF2}$ formed by the delayed phase axis of the retardation film with respect to the normal direction X ranges from 130° to 180° counterclockwise, as viewed from the light incident side. The angle $\phi_{Pol}$ formed by the absorption axis of the polarizing plate with respect to the normal direction X ranges from 80° to 130° or 170° to 220°, counterclockwise, as viewed from the light incident side. The above settings make the white display brighter, and improves contrast.

In the reflective liquid crystal display device having the above-described configuration, it is preferable that a coefficient $N_Z$, given by the following equation (1), of the retardation film adjacent to the other transparent substrate be within the range of −0.5 to 2.0 and that a coefficient $N_Z$ of the retardation film adjacent to the polarizing plate be within the range of −0.5 to 0.9', because this ensures a large high-contrast region of the display screen in vertical and horizontal directions, and thereby permits a wide angle of view in the vertical and horizontal directions of the display screen and yields good visual characteristics:

$$N_z = (n_x - n_z)/(n_x - n_y) \qquad (1)$$

where $n_x$ is the refractive index in the X-axis direction of the retardation film, $n_y$ is the refractive index in the Y-axis direction, and $n_z$ is the refractive index in the Z-axis direction.

In order to obtain higher contrast and better display characteristics, it is preferable to use a liquid crystal for the liquid crystal layer which has a wavelength dispersion characteristic of the birefringence $\Delta n_{LC}$ less than the wavelength dispersion characteristics of the birefringence $\Delta n_{RF1}$ of the retardation film adjacent to the other transparent substrate and the birefringence $\Delta n_{RF2}$ of the retardation film adjacent to the polarizing plate.

According to another aspect of the present invention, there is provided a reflective liquid crystal display device, wherein a transparent electrode and an alignment layer are placed in that order from the inner side of one of the transparent substrates on opposing sides of a liquid crystal layer in a liquid crystal cell of a normally white display type, a transparent electrode and an alignment layer are placed in that order from the inner side of the other transparent substrate, and two retardation films and a polarizing plate are placed in that order from the outer side of the other transparent substrate of the liquid crystal cell, wherein a retardation $\Delta nd_{LC}$ of the liquid crystal cell ranges from 705 nm to 1250 nm, and wherein, when an alignment direction a of the alignment layer on the side of the other transparent substrate and an alignment direction b of the alignment layer on the side of one of the transparent substrates are viewed from the light incident side, and the direction between the alignment directions a and b that bisects the interior angle, which is formed by an intersection O of the alignment directions a and b, and the alignment directions a and b, is designated a normal direction X, a retardation $\Delta nd_{RF1}$ of the retardation film adjacent to the other transparent substrate ranges from 115 nm to 250 nm, an angle $\phi_{RF1}$ formed by a delayed phase axis of the retardation film with respect to the normal direction X ranges from 65° to 95°, counterclockwise, as viewed from the light incident side, a retardation $\Delta nd_{RF2}$ of the retardation film adjacent to the polarizing plate ranges from 255 nm to 365 nm, an angle formed by a delayed phase axis of the retardation film with respect to the normal direction X ranges from 105° to 145°, counterclockwise, as viewed from the light incident side, and an angle $\phi_{Pol}$ formed by an absorption axis of the polarizing plate with respect to the normal direction X ranges from 60° to 95° or 150° to 185°, counterclockwise, as viewed from the light incident side.

According to the reflective liquid crystal display device of the present invention, in the liquid crystal cell of the normally white display type, the transparent electrode and the alignment layer are placed in that order from the inner side of one of the transparent substrates on opposite sides of the liquid crystal layer, the transparent electrode and the alignment layer are placed in that order from the inner side of the other transparent substrate, and two retardation films and the polarizing plate are placed in that order from the outer side of the other transparent substrate of the liquid crystal cell. Therefore, only a single polarizing plate is used, which makes it possible to improve transmittance in a no-voltage applied state (when a non-selection voltage is applied), and to brighten the white display. As a result, the contrast is improved, and excellent display characteristics are obtained.

In particular, $\Delta nd_{LC}$ of the liquid crystal cell ranges from 705 nm to 1250 nm, $\Delta nd_{RF1}$ of the retardation film adjacent to the other transparent substrate ranges from 115 nm to 250 nm, and the angle $\phi_{RF1}$ formed by the delayed phase axis of the retardation film with respect to the normal direction X ranges from 65° to 95°, counterclockwise, as viewed from the light incident side. $\Delta nd_{RF2}$ of the retardation film adjacent to the polarizing plate ranges from 255 nm to 365 nm, and the angle $\phi_{RF2}$ formed by the delayed phase axis of the retardation film with respect to the normal direction X ranges from 105° to 145° counterclockwise, as viewed from the light incident side. The angle $\phi_{Pol}$ formed by the absorption axis of the polarizing plate with respect to the normal direction X ranges from 60° to 95° or 150° to 185°, counterclockwise, as viewed from the light incident side. The above settings make the white display brighter, and improve contrast.

Further objects, features, and advantages of the present invention will become apparent from the following description of the preferred embodiments with reference to the attached drawings.

DESCRIPTION OF THE PREFERRED EMBODIMENTS

A reflective liquid crystal display device according to a first embodiment of the present invention will be described below in detail.

Figure 1:
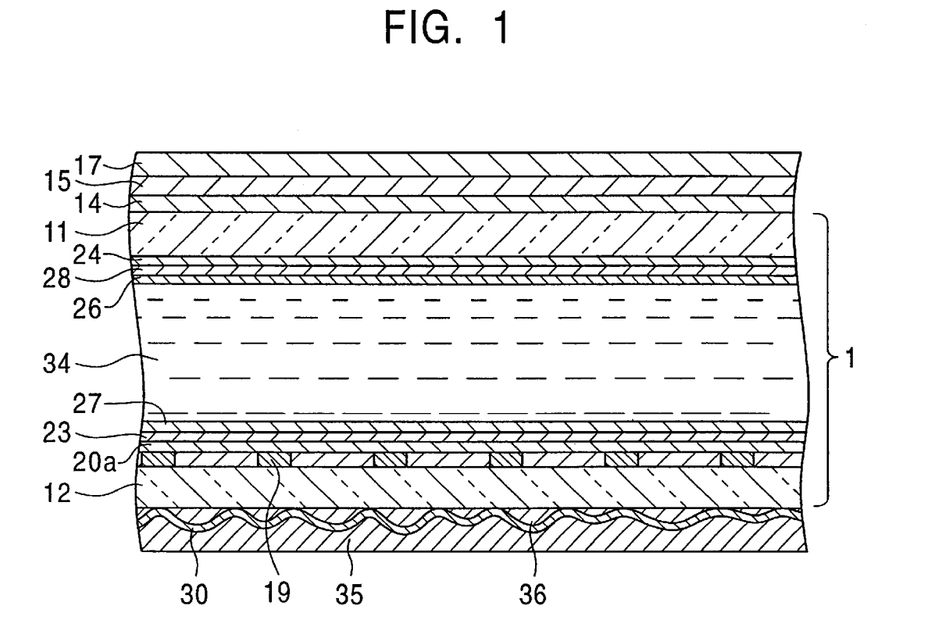
FIG. 1 is a cross-sectional view showing a first embodiment in which effective liquid crystal display device of the present invention is applied to a STN reflective color liquid crystal display device.

FIG. 1 is a cross-sectional view of the reflective liquid crystal display device of the first embodiment. The reflective liquid crystal display device of this embodiment generally comprises a liquid crystal cell 1, a first retardation film 14 adjacent to an upper glass substrate 11 of the liquid crystal cell 1, a polarizing plate 17, a second retardation film 15 adjacent to the polarizing plate 17, and a reflection plate 30. The first retardation film 14, the second retardation film 15, and the polarizing plate 17 are placed in that order on the outer side of the upper glass substrate 11, and the reflection plate 30 is disposed on the outer side of a lower glass substrate 12 of the liquid crystal cell 1.

In the liquid crystal cell 1, the upper and lower glass substrates 11 and 12 are opposed to each other across a liquid crystal layer 34. From the inner side of the lower glass substrates 12, a color filter 19, a first overcoat 20a, a common electrode (transparent electrode) 23, and a lower alignment layer 27 (on the side of the lower glass substrate 12) are placed in that order. From the inner side of the upper glass substrate 11, a segment electrode (transparent electrode) 24, a topcoat 28, and an upper alignment layer 26 (on the side of the upper glass substrate 11) are placed in that order.

The liquid crystal cell 1 provided in the reflective liquid crystal display device of the first embodiment adopts a normally black display method.

The upper and lower alignment layers 26 and 27 are of a commonly used transparent type, and are formed, for example, by subjecting a high-polymer film of polyimide or the like to rubbing.

Figure 2:
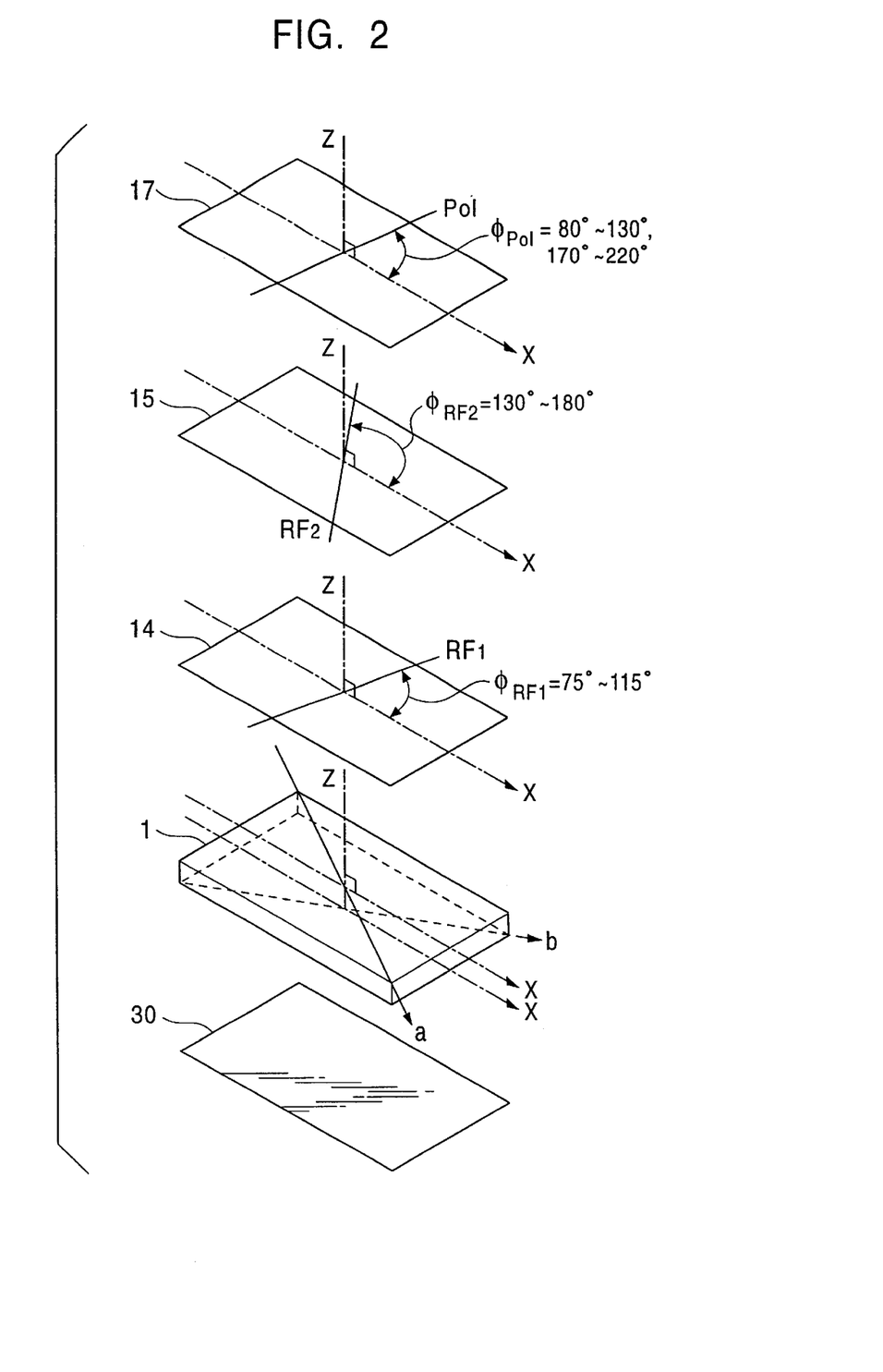
FIG. 2 is an exploded perspective view showing the principal part of the reflective liquid crystal display device of the first embodiment.

In this embodiment, when it is assumed that the counterclockwise direction as viewed from the light incident side is designated "+" and the clockwise direction is designated "−", as shown in FIG. 2, an alignment direction (rubbing direction) a of the upper alignment layer 26 is set to be within the range of −35° to −25°, more preferably, to be −30°. Furthermore, an alignment direction (rubbing direction) b of the lower alignment layer 27 is set to be within the range of 25° to 35°, more preferably, to be 30°.

Figure 3:
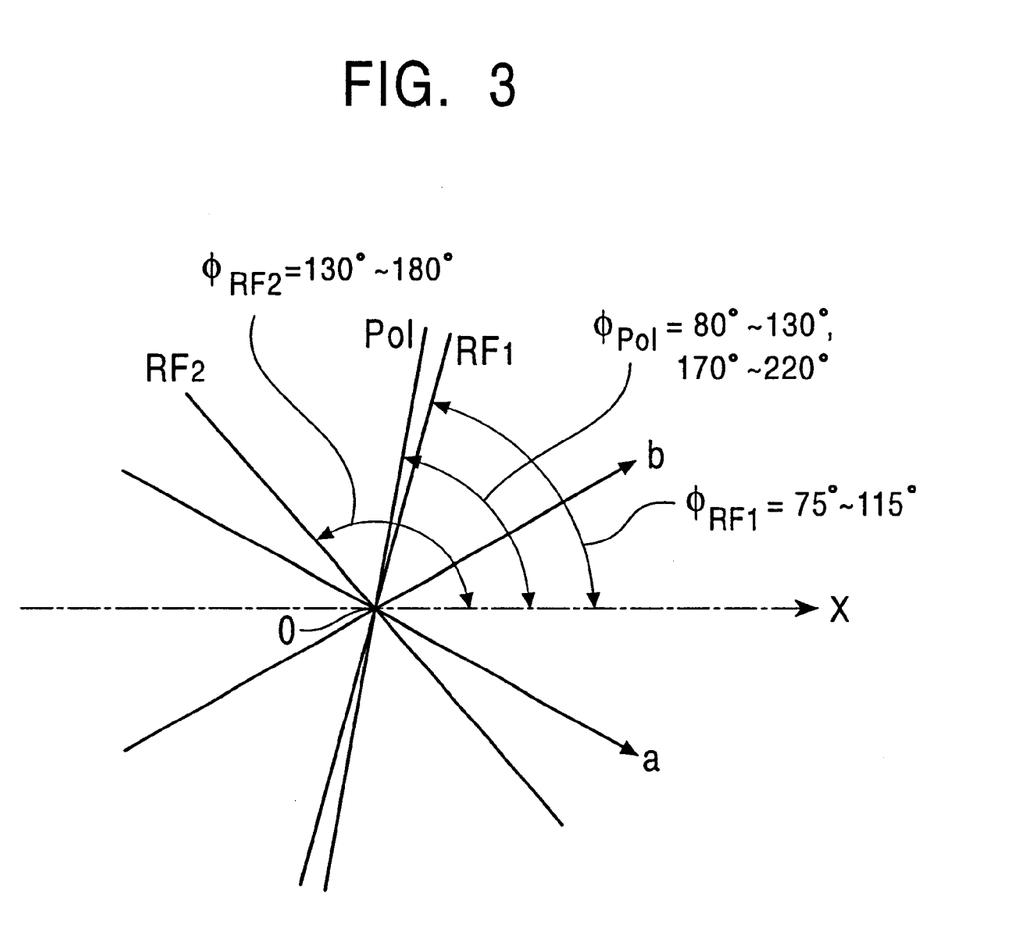
FIG. 3 is plan view showing a preferable positional relationship an absorption axis (Pol) of a polarizing plate, $RF_1$ of a first retardation film (adjacent to an upper glass substrate), $RF_2$ of a second retardation film (adjacent to the polarizing plate), an alignment direction a of an upper alignment layer (on the side of the upper glass substrate), and an alignment direction b of a lower alignment layer (on the side of a lower glass substrate), in the reflective liquid crystal display device of the first embodiment.

When the alignment direction a of the upper alignment layer 26 and the alignment direction b of the lower alignment layer 27 are viewed from the light incident side, as shown in FIGS. 2 and 3, the direction between the alignment directions a and b that bisects the interior angle, which is formed by an intersection O of the alignment directions a and b, and the alignment directions a and b, is designated a "normal direction X".

In the figures, Z represents the direction that is orthogonal to the light incident surfaces of the liquid crystal cell 1, the first and second retardation films 14 and 15, and the polarizing plate 17.

The liquid crystal layer 34 has a spiral structure twisted by 230° to 250° in the direction of thickness thereof, and includes liquid crystal molecules that are sealed in a region surrounded by the upper and lower alignment layers 26 and 27 disposed inside the upper and lower glass substrates 11 and 12, and a sealing member (not shown) joining the alignment layers 26 and 27 at a predetermined distance, and that are in a nematic state at ordinary temperature. These liquid crystal molecules are of a super-twisted nematic (STN) type.

In order to obtain higher contrast and better display characteristics, it is preferable that the wavelength dispersion characteristic of the birefringence $\Delta n_{LC}$ of the liquid crystal in the liquid crystal layer 34 be less than the wavelength dispersion characteristic of $\Delta n_{RF1}$ of the first retardation film 14 and the wavelength dispersion characteristic of $\Delta n_{RF2}$ of the second retardation film 15. The wavelength dispersion characteristic of $\Delta n_{LC}$ of the liquid crystal constituting the liquid crystal layer 34 can be altered by changing the liquid crystal material itself. Furthermore, the wavelength dispersion characteristics of $\Delta n_{RF1}$ and $\Delta n_{RF2}$ of the first and second retardation film 14 and 15 can be altered by changing the material of the retardation films.

The topcoat 28 is provided to ensure insulating properties, and is made of an inorganic material, such as silica or $ZrO_2$.

Although the material of the upper glass substrate 11 varies depending on the type of the liquid crystal display device, soda lime glass or the like is employed in this embodiment. Although the thickness of the upper glass substrate 11 also varies depending on the type of the liquid crystal display device, a preferable thickness is within the range of 0.3 mm to 1.1 mm.

The first overcoat 20a is provided to smooth the uneven surface of the color filter 19, and is made of an organic material that strongly adheres to the color filter 19, e.g., polyvinyl alcohol or acrylic resin.

In the color filter 19, pixels of the three primary colors, red, blue, and green, are formed in a desired pattern by photolithography, printing, or the like. The color filter 19 may also have a linear black matrix patterned around the pixels, and the adjoining pixels may partly overlap each other.

Although the material of the lower glass substrate 12 varies depending on the type of the liquid crystal display device, soda lime glass containing an oxide of an alkali metal, such as sodium, or the like is employed in this embodiment. A preferable thickness of the lower glass substrate 12 is within the range of 0.3 mm to 1.1 mm.

The reflection plate 30 serves to increase the angle of view by reflecting and diffusing incident light.

The reflection plate 30 in the reflective liquid crystal display device of the first embodiment is formed of a metal film of Al, Ag, or the like provided on the uneven surface of a glass substrate 35 disposed outside the lower glass substrate 12.

Furthermore, the reflection plate 30 is bonded to the lower glass substrate 12 by a transparent bonding layer 36 made of an epoxy material containing fluorine.

The retardation $\Delta nd_{LC}$, which is the product of the birefringence $\Delta n_{LC}$ and the thickness d of the above-described liquid crystal cell 1, is set to be within the range of 705 nm to 890 nm (measured wavelength: 589 nm). When $\Delta nd_{LC}$ is out of the above range, the white display is darkened and the contrast decreases.

In order to obtain high. contrast and good monochrome display, it is generally preferable that $\Delta nd_{LC}$ be set to be within the range of 740 nm to 820 nm, more preferably, within the range of 760 nm to 800 nm.

The first and second retardation films 14 and 15 are formed of a uniaxially or biaxially-oriented film made of polyvinyl alcohol or polycarbonate, or the like. The direction of orientation serves as the delayed phase axis.

The retardation $\Delta nd_{RF1}$ of the first retardation film 14 is set within the range of 195 nm to 280 nm. As shown in FIGS. 2 and 3, the delayed phase axis $RF_1$ of the first retardation film 14 is set so that it forms an angle $\phi_{RF1}$ of 75° to 115° with respect to the above-described normal direction X, counterclockwise, as viewed from the light incident side.

The retardation $\Delta nd_{RF2}$ of the second retardation film 15 is set within the range of 310 nm to 415 nm. As shown in FIGS. 2 and 3, the delayed phase axis $RF_2$ of the second retardation film 15 is set so that it forms an angle $\phi_{RF2}$ of 130° to 180° with respect to the above-described normal direction X, counterclockwise, as viewed from the light incident side.

When $\Delta nd_{RF1}$ and $\Delta nd_{RF2}$ of the first and second retardation films 14 and 15 are out of the above ranges, it is impossible to obtain a high contrast or a bright white display.

When $RF_1$ and $RF_2$ of the first and second retardation films 14 and 15 are out of the above ranges, it is also impossible to obtain a high contrast or a bright white display.

In order to obtain high contrast and a good monochrome display, it is more preferable that $RF_1$ of the first retardation film 14 be set to form an angle $\phi_{RF1}$ of 90° to 110° counterclockwise, as viewed from the light incident side, with respect to the above-described normal direction X.

For the same purpose, it is more preferable that $RF_2$ of the second retardation film 15 be set to form an angle $\phi_{RF2}$ of 130° to 165°, counterclockwise, as viewed from the light incident side, with respect to the above-described normal direction X.

Furthermore, it is preferable that the first retardation film 14 have a coefficient $N_z$ ranging from −0.5 to 2.0 that is given by the following equation (1), and that the second retardation film 15 have a coefficient $N_z$ ranging from −0.5 to 0.9, because this ensures a large high-contrast region of the display screen in vertical and horizontal directions, and thereby permits a wide angle of view in the vertical and horizontal directions of the display screen and good visual characteristics:

$$N_z=(n_x-n_z)/(n_x-n_y) \quad (1)$$

where $n_x$ is the refractive index in the X-axis direction of the retardation film, $n_y$ is the refractive index in the Y-axis direction, and $n_z$ is the refractive index in the Z-axis direction.

As shown in FIGS. 2 and 3, it is generally preferable that the absorption axis Pol of the polarizing plate 17 be set to form an angle $\phi_{Pol}$ ranging from 80° to 130° or 170° to 220°, counterclockwise, as viewed from the light incident side, with respect to the normal direction X.

When Pol of the polarizing plate 17 is out of the above range, it is impossible to obtain a high-contrast or good monochrome display. In order to obtain a higher contrast and better monochrome display, it is more preferable that the angle $\phi_{Pol}$ be set within the range of 80° to 110° or 170° to 220°.

In the reflective liquid crystal display device of the first embodiment having the above-described configuration, a single polarizing plate is used. This makes it possible to improve the transmittance in the voltage applied state, and to brighten the light display. As a result, the contrast is improved, and good display characteristics are obtained.

In particular, $\Delta nd_{LC}$ of the liquid crystal cell 1, $\Delta nd_{RF1}$ and the angle $\phi_{RF1}$ of the first retardation film 14 formed by $RF_1$ and the normal direction X, $\Delta nd_{RF2}$ and the angle $\phi_{RF2}$ of the second retardation film 15 formed by $RF_2$ and the normal direction X, and the angle $\phi_{Pol}$ formed by Pol of the polarizing plate 17 and the normal direction X, are set within the above ranges, respectively. Therefore, the white display becomes brighter, and the contrast is increased.

Furthermore, the first retardation film 14 has a coefficient $N_Z$ ranging from −0.5 to 2.0, and the second retardation film 15 has a coefficient $N_Z$ ranging from −0.5 to 0.9. Therefore, it is possible to obtain a large high-contrast region of the display screen in vertical and horizontal directions, a wide angle of view in the vertical and horizontal directions of the display screen, and good visual characteristics.

When the liquid crystal that forms the liquid crystal layer 34 has a wavelength dispersion characteristic of birefringence $\Delta n_{LC}$ thereof that is less than the wavelength dispersion characteristics of $\Delta n_{RF1}$ and $\Delta n_{RF2}$ of the first and second retardation films 14 and 15, respectively it is possible to obtain improved contrast and good display characteristics.

While the topcoat 28 is interposed between the upper alignment layer 26 and the segment electrode 24, the first overcoat 20a is interposed between the common electrode 23 and the color filter 19, and the color filter 19 is placed inside the liquid crystal cell 1 in the above description of the reflective liquid crystal display device of the first embodiment, the topcoat 28, the first overcoat 20a, and the color filter 19 need not always be provided, and may be appropriately provided according to the type of the reflective liquid crystal display device, and required characteristics.

While the color filter 19 is placed inside the liquid crystal cell 1 in the reflective liquid crystal display device of the first embodiment, it may also be placed outside the liquid crystal cell 1.

While the reflection plate 30 in the first embodiment is of an exterior type that is placed outside the liquid crystal cell 1, it be of an interior type placed inside the liquid crystal cell 1.

The alignment directions a and b of the upper alignment layer 26 and the lower alignment layer 27, respectively, are not limited to the above, and may by appropriately set according to the type of the reflective liquid crystal display device and required characteristics.

Next, a reflective liquid crystal display device according to a second embodiment of the present invention will be described.

Figure 4:
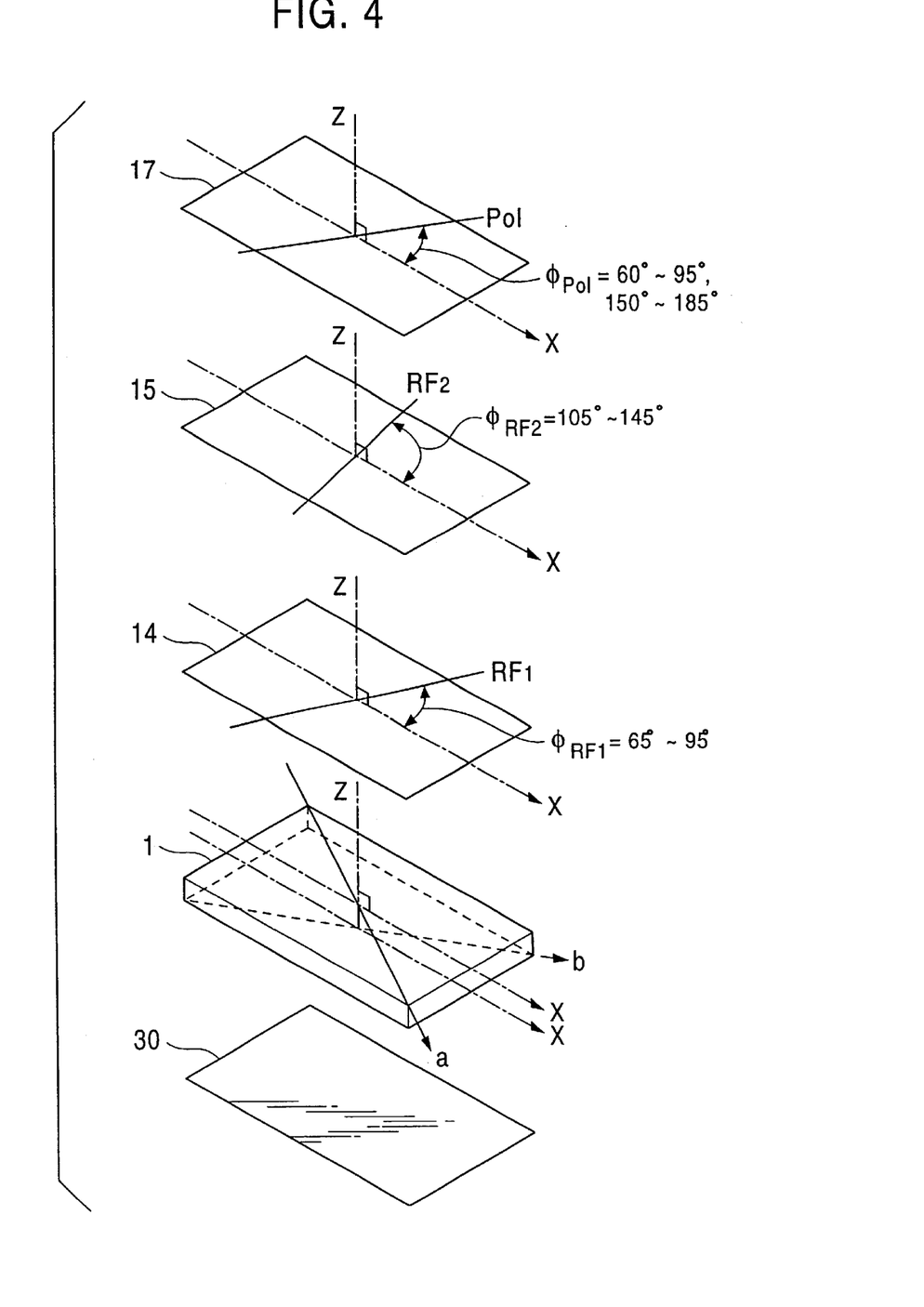
FIG. 4 is an exploded perspective view showing the principal part of a reflective liquid crystal display device according to a second embodiment of the present invention.
Figure 5:
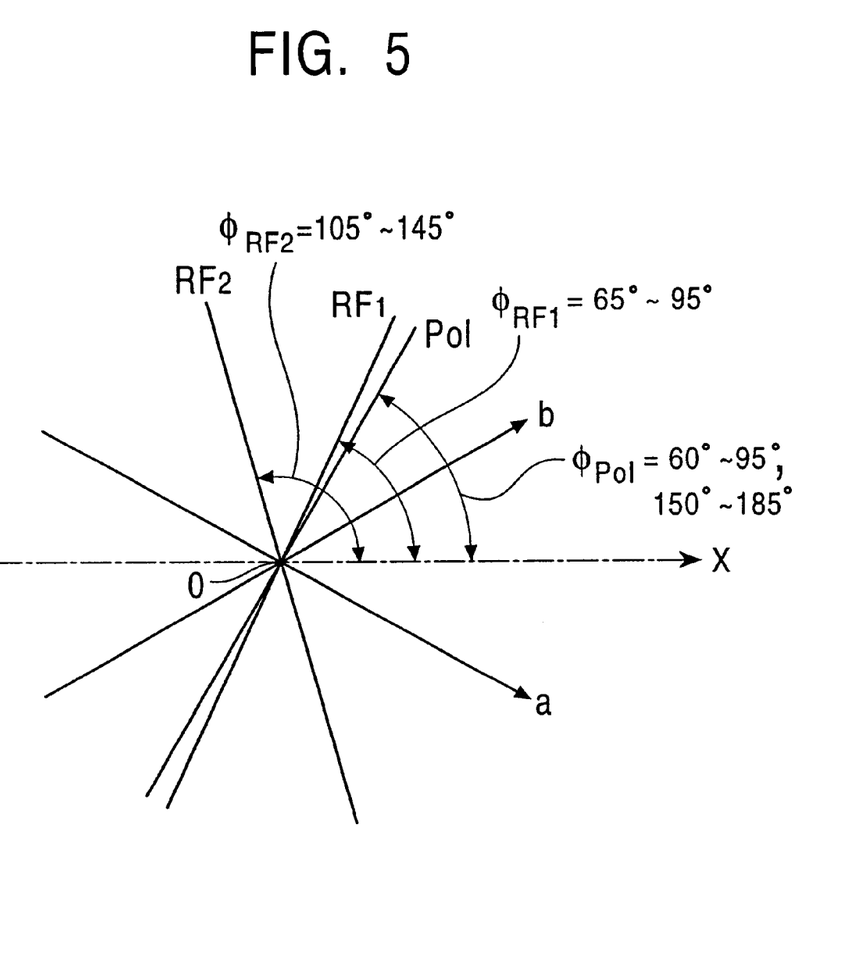
FIG. 5 is a plan view showing a preferable positional relationship among an absorption axis (Pol) of a polarizing plate, $RF_1$ of a first retardation film (adjacent to an upper glass substrate), $RF_2$ of a second retardation film (adjacent to the polarizing plate), an alignment direction a of an upper alignment layer (on the side of the upper glass substrate), and an alignment direction b of a lower alignment layer (on the side of a lower glass substrate), in the reflective liquid crystal display device of the second embodiment.

The reflective liquid crystal display device of the second embodiment is different from that of the first embodiment in the following ways: A liquid crystal cell 1 adopts a normally white display method, $\Delta nd_{LC}$ of the liquid crystal cell 1 ranges from 705 nm to 1250 nm, as shown in FIGS. 4 and 5, $\Delta nd_{RF1}$ of a first retardation film 14 ranges from 115 nm to 250 nm, $RF_1$ of the first retardation film 14 forms an angle $\phi_{RF1}$ of 65° to 95° with respect to the normal direction X, counterclockwise, as viewed from the light incident side, $\Delta nd_{RF2}$ of a second retardation film 15 ranges from 255 nm to 365 nm, $RF_2$ of the second retardation film 15 forms an angle $\phi_{RF2}$ of 105° to 145° with respect to the normal direction X, counterclockwise, as viewed from the light incident side, and Pol of the polarizing plate 17 forms an angle $\phi_{Pol}$ of 60° to 95° or 150° to 185° with respect to the normal direction X, counterclockwise, as viewed from the light incident side.

When $\Delta nd_{LC}$ of the liquid crystal cell 1 is out of the above range, the white display is darkened and the contrast decreases.

When $\Delta nd_{RF1}$ and $\Delta nd_{RF2}$ of the first and second retardation films 14 and 15 are out of the above ranges, it is impossible to obtain a high contrast or a bright white display.

When $RF_1$ and $RF_2$ of the first and second retardation films 14 and 15 are out of the above ranges, it is also impossible to obtain a high contrast or a bright white display.

In order to obtain a high-contrast and good monochrome display, it is more preferable that $RF_1$ of the first retardation film 14 form an angle $\phi_{RF1}$ of 70° to 85° with respect to the normal direction X, counterclockwise, as viewed from the light incident side.

For the same purpose, it is more preferable that $RF_2$ of the second retardation film 15 form an angle $\phi_{RF2}$ of 110° to 130° with respect to the normal direction X, counterclockwise, as viewed from the light incident side.

When Pol of the polarizing plate 17 is not set to be within the above range, it is impossible to obtain a high-contrast and good monochrome display. In order to obtain a higher-contrast and better monochrome display, it is more preferable that Pol of the polarizing plate 17 form an angle $\phi_{Pol}$ of 65° to 85° or 155° to 175° with respect to the normal direction X, counterclockwise, as viewed from the light incident side.

The wavelength dispersion characteristic of birefringence $\Delta n_{LC}$ of the liquid crystal that forms a liquid crystal layer 34 in the second embodiment is not limited to the range described in the first embodiment. Furthermore, the coefficients $N_z$ of the first and second retardation films 14 and 15, respectively, in the second embodiment are not limited to the ranges described in the first embodiment.

According to the reflective liquid crystal display device of the second embodiment having the above-described configuration, a single polarizing plate is used, which increases the transmittance the no-voltage applied state (when a non-selection voltage is applied), and brightens white display. As a result, the contrast increases, and good display characteristics are obtained.

In particular, $\Delta nd_{LC}$ of the liquid crystal cell 1, $\Delta nd_{RF1}$ and the angle $\phi_{RF1}$ formed by $RF_1$ of the first retardation film 14 and the normal direction X, $\Delta nd_{RF2}$ and the angle $\phi_{RF2}$ formed by $RF_2$ of the second retardation film 15 and the normal direction X, and the angle $\phi_{Pol}$ formed by Pol of the polarizing plate 17 and the normal direction X, are set within the above ranges, respectively. Therefore, the white display becomes brighter, and the contrast is increased.

The present invention will be described in more detail in conjunction with the following examples and comparative examples. However, the present invention is not limited to these examples.

EXPERIMENTAL EXAMPLE 1

Examinations were made of display characteristics of a reflective liquid crystal display device of a normally black display type having almost the same configuration of the reflective liquid crystal display device shown in FIGS. 1 to 3.

In this case, PSI-2501 (trade name; manufactured by Chisso Corp.) was used for upper and lower alignment layers constituting a liquid crystal cell, and was subjected to orientation so that the twist angle of the liquid crystal was 240°. The alignment direction a of the upper alignment layer was −30°, and the alignment direction of the lower alignment direction b was 30°. As the liquid crystal for a liquid crystal layer, AP-4268LA (trade name; manufactured by Chisso Sekiyu Kagaku Kabushiki Kaisha) was used. The liquid crystal cell did not include a color filter.

NRZ-420 (trade name; manufactured by Nitto Denko Corp., made of polycarbonate) was used as a first retardation film, NRZ-430 (trade name; manufactured by Nitto Denko Corp., made of polycarbonate) was used as a second retardation film, and NPF-EG1225DU (trade name; manufactured by Nitto Denko Corp.) was used as a polarizing plate.

$\Delta nd_{LC}$ of the liquid crystal cell (measured wavelength: 589 nm), $\Delta nd_{RF1}$ of the first retardation film, the angle $\phi_{RF1}$ formed by $RF_1$ of the first retardation film with respect to the normal direction X, $\Delta nd_{RF2}$ of the second retardation film, the angle $\phi_{RF2}$ formed by $RF_2$ of the second retardation film with respect to the normal direction X, and the angle $\phi_{Pol}$ formed by Pol of the polarizing plate with respect to the normal direction X, were set as shown in the following Table 1 (Examples, Sample Nos. 1 to 14).

For comparison, $\Delta nd_{LC}$ of the liquid crystal cell (measured wavelength: 589 nm), $\Delta nd_{RF1}$ of the first retardation film, the angle $\phi_{RF1}$ formed by $RF_1$ of the first retardation film with respect to the normal direction X, $\Delta nd_{RF2}$ of the second retardation film, the angle $\phi_{RF2}$ formed by $RF_2$ of the second retardation film with respect to the normal direction X, and the angle $\phi_{Pol}$ formed by Pol of the polarizing plate with respect to the normal direction X, were set as shown in the following Table 2 so that they are out of the ranges of the present invention (Comparative Examples, Sample Nos. 15 to 22).

Display characteristics of Samples Nos. 1 to 22 were examined in the following way. That is, the light source, the polarizing plate, the second retardation film, the first retardation film, the liquid crystal cell, and the reflection plate were placed in that order. Light was incident on the liquid crystal cell at an azimuth angle of 180° from the Z-direction shown in FIG. 1 (in the direction of 0°, from directly above), and reflected light in the Z-direction was received at a receiving angle of 0°. Y (brightness) and CR (contrast) in this case were examined in a white display state (a voltage of 2.25 V was applied) in the normally black mode (N/B). The results are shown in the following Tables 1 and 2:

TABLE 1

| | (N/B) | | | | | | |
|---|---|---|---|---|---|---|---|
| Sample No. | $\Delta nd_{LC}$ (nm) | $\phi Pol$ (°) | $\Delta nd_{RF2}$ (nm) | $\phi RF_2$ (°) | $\Delta nd_{RF1}$ (nm) | $\phi RF_1$ (°) | Y | Contrast |
| 1 | 720.7 | 104.5 | 315 | 156.5 | 195 | 99.0 | 34.6196 | 21.26 |
| 2 | 720.7 | 104.5 | 315 | 156.5 | 205 | 99.0 | 33.2533 | 38.07 |
| 3 | 720.7 | 104.5 | 310 | 156.5 | 215 | 99.0 | 30.1372 | 38.65 |
| 4 | 720.7 | 104.5 | 315 | 156.5 | 215 | 99.0 | 31.4705 | 44.55 |
| 5 | 782.3 | 77.5 | 355 | 132.0 | 230 | 83.0 | 31.2818 | 20.04 |
| 6 | 782.3 | 82.5 | 355 | 137.0 | 230 | 88.0 | 32.9755 | 48.28 |
| 7 | 782.3 | 88.5 | 355 | 143.0 | 230 | 94.0 | 34.9742 | 43.54 |
| 8 | 819.3 | 107.5 | 375 | 161.5 | 245 | 107.0 | 37.0051 | 27.44 |

TABLE 1-continued (N/B)

| Sample No. | $\Delta nd_{LC}$ (nm) | $\phi Pol$ (°) | $\Delta nd_{RF2}$ (nm) | $\phi RF_2$ (°) | $\Delta nd_{RF1}$ (nm) | $\phi RF_1$ (°) | Y | Contrast |
|---|---|---|---|---|---|---|---|---|
| 9 | 819.3 | 122.5 | 365 | 172.0 | 245 | 107.5 | 36.1975 | 34.69 |
| 10 | 819.3 | 126.0 | 365 | 175.5 | 245 | 110.0 | 36.4970 | 29.43 |
| 11 | 819.3 | 129.5 | 365 | 179.0 | 245 | 114.5 | 36.8707 | 20.09 |
| 12 | 883.3 | 107.0 | 410 | 155.0 | 275 | 105.0 | 36.3191 | 23.29 |
| 13 | 883.3 | 107.0 | 410 | 155.0 | 280 | 105.0 | 36.4432 | 20.83 |
| 14 | 883.3 | 107.0 | 415 | 155.0 | 275 | 105.0 | 35.9418 | 21.55 |

TABLE 2

(N/B)

| Sample No. | $\Delta nd_{LC}$ (nm) | $\phi Pol$ (°) | $\Delta nd_{RF2}$ (nm) | $\phi RF_2$ (°) | $\Delta nd_{RF1}$ (nm) | $\phi RF_1$ (°) | Y | Contrast |
|---|---|---|---|---|---|---|---|---|
| 15 | 702.2 | 95.0 | 310 | 146.5 | 205 | 92.0 | 29.4453 | 110.50 |
| 16 | 720.7 | 104.5 | 315 | 156.5 | 190 | 99.0 | 35.1609 | 15.95 |
| 17 | 720.7 | 104.5 | 305 | 156.5 | 215 | 99.0 | 28.6149 | 25.79 |
| 18 | 782.3 | 73.5 | 355 | 128.0 | 230 | 79.0 | 30.0582 | 10.77 |
| 19 | 819.3 | 131.5 | 365 | 181.0 | 245 | 116.5 | 36.9544 | 16.47 |
| 20 | 883.3 | 107.0 | 410 | 155.0 | 285 | 105.0 | 36.4439 | 17.38 |
| 21 | 883.3 | 107.0 | 420 | 155.0 | 275 | 105.0 | 35.4455 | 17.54 |
| 22 | 895.7 | 123.0 | 420 | 172.0 | 280 | 104.0 | 34.8080 | 17.36 |

As the results in Tables 1 and 2 show, in some of Sample Nos. 15 to 22 (comparative examples), in which $\Delta nd_{LC}$ of the liquid crystal cell (measured wavelength: 589 nm), $\Delta nd_{RF1}$ of the first retardation film, the angle $\phi_{RF1}$ formed by $RF_1$ of the first retardation film with respect to the normal direction X, $\Delta nd_{RF2}$ of the second retardation film, the angle $\phi_{RF2}$ formed by $RF_2$ of the second retardation film with respect to the normal direction X, and the angle $\phi_{Pol}$ formed by Pol of the polarizing plate with respect to the normal direction X, were out of the ranges of the present invention, the contrast is less than 20, or the Y-value in the white display state is less than 30, which yields a dark display. In contrast, Sample Nos. 1 to 14 as the examples of the present invention exhibited a contrast of more than 20, and a Y-value in the white display state that is greater than 30, which yields a bright display. This reveals that the white display is bright, the contrast is high, and display characteristics are good, compared with the comparative examples.

EXPERIMENTAL EXAMPLE 2

Examinations were made of display characteristics of a reflective liquid crystal display device of a normally white display type having almost the same configuration of the reflective liquid crystal display device shown in FIGS. 1, 4, and 5.

The materials for forming upper and lower alignment layers and a liquid crystal layer, which constitute a liquid crystal cell, and the alignment directions a and b of the upper and lower alignment layers were the same as those in the above Experimental Example 1. A first retardation film, a second retardation film, and a polarizing plate were also the same as those in the above Comparative Example 1.

$\Delta nd_{LC}$ of the liquid crystal cell (measured wavelength: 589 nm), $\Delta nd_{RF1}$ of the first retardation film, the angle $\phi_{RF1}$ formed by $RF_1$ of the first retardation film with respect to the normal direction X, $\Delta nd_{RF2}$ of the second retardation film, the angle $\phi_{RF2}$ formed by $RF_2$ of the second retardation film with respect to the normal direction X, and the angle $\phi_{Pol}$ formed by Pol of the polarizing plate with respect to the normal direction X, were set as shown in the following Table 3 (Examples, Sample Nos. 31 to 42).

For comparison, $\Delta nd_{LC}$ of the liquid crystal cell (measured wavelength: 589 nm), $\Delta nd_{RF1}$ of the first retardation film, the angle $\phi_{RF1}$ formed by $RF_1$ of the first retardation film with respect to the normal direction X, $\Delta nd_{RF2}$ of the second retardation film, the angle $\phi_{RF2}$ formed by $RF_2$ of the second retardation film with respect to the normal direction X, and the angle $\phi_{Pol}$ formed by Pol of the polarizing plate with respect to the normal direction X, were set as shown in the following Table 4 so that they are out of the ranges of the present invention (Comparative Examples, Sample Nos. 43 to 49).

Display characteristics of Sample Nos. 31 to 49 were examined in the following way. That is, the light source, the polarizing plate, the second retardation film, the first retardation film, the liquid crystal cell, and the reflection plate were placed in that order. Light was incident on the liquid crystal cell at an azimuth angle of 180° from the Z-direction shown in FIG. 1 (in the direction of 0°, from directly above), and reflected light in the Z-direction was received at a receiving angle of 0°. Y (brightness) and CR (contrast) in this case were examined in a white display (a voltage of 2.10V was applied) in the normally white mode (N/W). The results are shown in the following Tables 3 and 4:

TABLE 3

(N/W)

| Sample No. | $\Delta nd_{LC}$ (nm) | $\phi Pol$ (°) | $\Delta nd_{RF2}$ (nm) | $\phi RF_2$ (°) | $\Delta nd_{RF1}$ (nm) | $\phi RF_1$ (°) | Y | Contrast |
|---|---|---|---|---|---|---|---|---|
| 31 | 709.8 | 66.5 | 255 | 111.5 | 115 | 69.5 | 31.3838 | 23.91 |
| 32 | 709.8 | 63.0 | 265 | 108.0 | 115 | 66.0 | 32.2205 | 22.25 |
| 33 | 709.8 | 66.5 | 265 | 111.5 | 115 | 69.5 | 30.0548 | 43.99 |

TABLE 3-continued (N/W)

| Sample No. | $\Delta nd_{LC}$ (nm) | φPol (°) | $\Delta nd_{RF2}$ (nm) | φRF$_2$ (°) | $\Delta nd_{RF1}$ (nm) | φRF$_1$ (°) | Y | Contrast |
|---|---|---|---|---|---|---|---|---|
| 34 | 819.3 | 72.0 | 270 | 117.0 | 150 | 76.0 | 35.2273 | 129.91 |
| 35 | 906.9 | 71.5 | 295 | 116.5 | 160 | 74.5 | 35.1888 | 85.26 |
| 36 | 1009.5 | 73.0 | 310 | 118.0 | 180 | 76.5 | 32.3237 | 102.18 |
| 37 | 1199.5 | 89.0 | 340 | 134.0 | 230 | 87.5 | 31.7062 | 160.34 |
| 38 | 1199.5 | 92.0 | 340 | 137.0 | 230 | 90.5 | 30.0208 | 36.13 |
| 39 | 1201.2 | 81.5 | 350 | 126.5 | 230 | 83.0 | 32.1525 | 335.26 |
| 40 | 1201.2 | 81.5 | 350 | 126.5 | 250 | 83.0 | 34.0465 | 28.54 |
| 41 | 1201.2 | 81.5 | 365 | 126.5 | 230 | 83.0 | 30.2457 | 25.66 |
| 42 | 1214.5 | 86.5 | 340 | 132.0 | 225 | 86.0 | 32.9130 | 563.68 |

TABLE 4

(N/W)

| Sample No. | $\Delta nd_{LC}$ (nm) | φPol (°) | $\Delta nd_{RF2}$ (nm) | φRF$_2$ (°) | $\Delta nd_{RF1}$ (nm) | φRF$_1$ (°) | Y | Contrast |
|---|---|---|---|---|---|---|---|---|
| 43 | 702.2 | 72.0 | 250 | 117.0 | 130 | 75.0 | 29.2508 | 79.24 |
| 44 | 709.8 | 66.5 | 265 | 111.5 | 110 | 69.5 | 29.8705 | 42.51 |
| 45 | 709.8 | 66.5 | 250 | 111.5 | 115 | 69.5 | 32.0402 | 16.27 |
| 46 | 709.8 | 59.5 | 265 | 104.5 | 115 | 62.5 | 34.1090 | 10.57 |
| 47 | 1201.2 | 81.5 | 350 | 126.5 | 255 | 83.0 | 34.4865 | 19.27 |
| 48 | 1201.2 | 81.5 | 370 | 126.5 | 230 | 83.0 | 29.4519 | 36.41 |
| 49 | 1199.5 | 97.0 | 340 | 142.0 | 230 | 95.5 | 27.1540 | 13.18 |

As the results in Tables 3 and 4 show, in some of Sample Nos. 43 to 49 (comparative examples), in which $\Delta nd_{LC}$ of the liquid crystal cell (measured wavelength: 589 nm), $\Delta nd_{RF1}$ of the first retardation film, the angle $\phi_{RF1}$ formed by RF$_1$ of the first retardation film with respect to the normal direction X, $\Delta nd_{RF2}$ of the second retardation film, the angle $\phi_{RF2}$ formed by RF$_2$ of the second retardation film with respect to the normal direction X, and the angle $\phi_{Pol}$ formed by Pol of the polarizing plate with respect to the normal direction X, were out of the ranges of the present invention, the contrast is less than 20, and the Y-value in the white display state is less than 30, which yields a dark display. In contrast, Sample Nos. 31 to 42 as the examples of the present invention provide a contrast higher than 20, and a Y-value in the white display state that is greater than 30, which yields a bright display. This reveals that the white display is bright, the contrast is high, and display characteristics are good, compared with the comparative examples.

EXPERIMENTAL EXAMPLE 3

Examinations were made of visual characteristics of the reflective liquid crystal display device (first embodiment) of a normally black display type having a configuration similar to that of the liquid crystal display device used in the above Experimental Example 1, except that $\Delta nd_{LC}$ of a liquid crystal cell was 800 nm (measured wavelength: 589 nm), $\Delta nd_{RF1}$ of a first retardation film was 235 nm, the angle $\phi_{RF1}$ formed by RF$_1$ of the first retardation film with respect to the normal direction X was 99.5°, N$_z$ was 0.5, $\Delta nd_{RF2}$ of a second retardation film was 360 nm, the angle $\phi_{RF2}$ formed by RF$_2$ of the second retardation film with respect to the normal direction X was 151°, N$_z$ was 0.1, and the angle $\phi_{Pol}$ formed by Pol of the polarizing plate with respect to the normal direction X was 96.5°.

Figure 6:
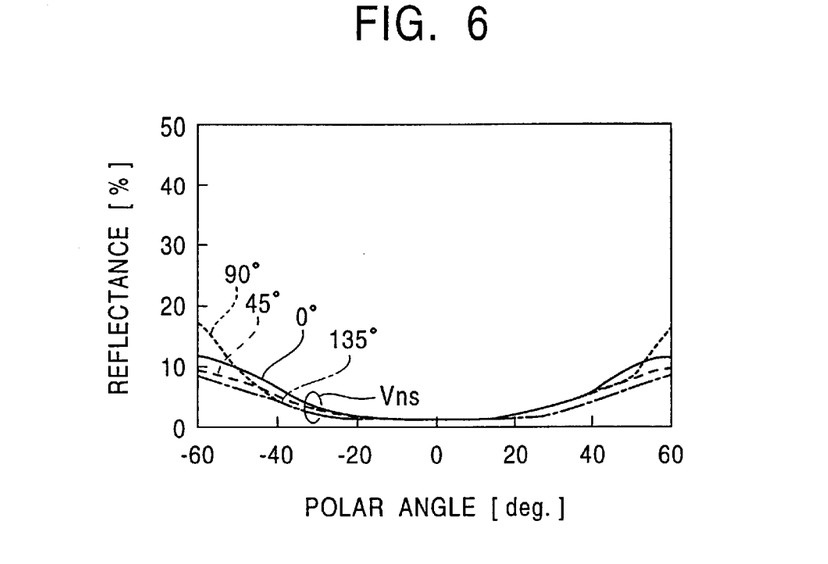
FIG. 6 is a graph showing visual characteristics of the normally black type reflective liquid crystal display device (first embodiment).

As the visual characteristics, the reflectance (%) in the direction of the polar angle was measured when the direction in which the black display on the display screen of the liquid crystal display device is viewed from the light incident side changes to 0°, 45°, 90°, and 135°. The results are shown in FIG. 6. In FIG. 6, V$_{ns}$ indicates a non-selection state.

Figure 7:
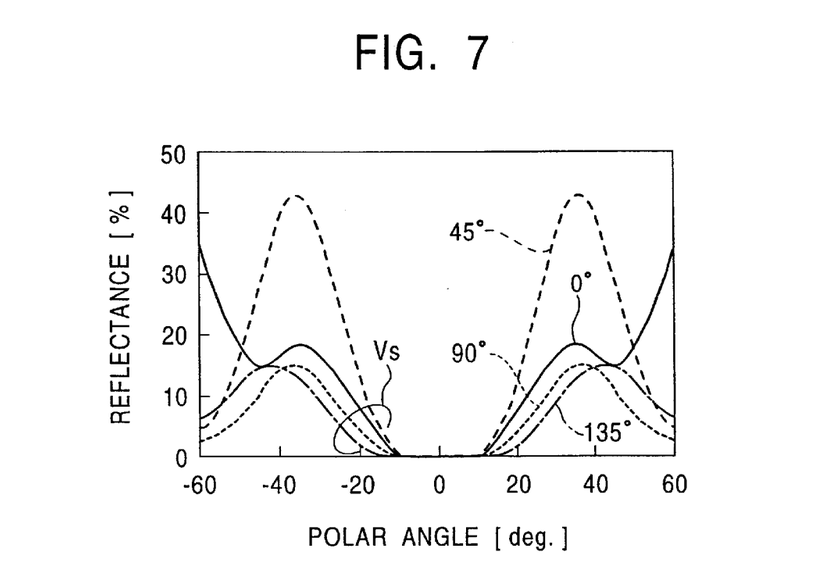
FIG. 7 is a graph showing visual characteristics of a normally white type reflective liquid crystal display device (Comparative Example 1).

For comparison, examinations were made, in a similar manner, of visual characteristics of the reflective liquid crystal display device (Comparative Example 1) of a normally white display type having a configuration similar to that of the liquid crystal display device used in the above Experimental Example 2, except that $\Delta nd_{LC}$ of a liquid crystal cell was 800 nm (measured wavelength: 589 nm), $\Delta nd_{RF1}$ of a first retardation film was 155 nm, the angle $\phi_{RF1}$ formed by RF$_1$ of the first retardation film with respect to the normal direction X was 78°, N$_z$ was −1.5, $\Delta nd_{RF2}$ of a second retardation film was 265 nm, the angle $\phi_{RF2}$ formed by RF$_2$ of the second retardation film with respect to the normal direction X was 120°, N$_z$ was −1.5, and the angle $\phi_{Pol}$ formed by Pol of the polarizing plate with respect to the normal direction X was 75°. The results are shown in FIG. 7. In FIG. 7, V$_s$ indicates a selected state.

As the results in FIGS. 6 and 7 show, in Comparative Example 1 of a normally white display type, in which $\Delta nd_{LC}$ of the liquid crystal cell (measured wavelength: 589 nm), $\Delta nd_{RF1}$ of the first retardation film, the angle $\phi_{RF1}$ formed by RF$_1$ of the first retardation film with respect to the normal direction X, N$_z$, $\Delta nd_{RF2}$ of the second retardation film, the angle $\phi_{RF2}$ formed by RF$_2$ of the second retardation film with respect to the normal direction X, N$_z$, and the angle $\phi_{Pol}$ formed by Pol of the polarizing plate with respect to the normal direction X are out of the ranges of the present invention, the reflectance changes with the changes in viewing direction. That is, light leakage is large in the black display, and the contrast is low. In contrast, in the first embodiment, the reflectance hardly changes even when the viewing direction changes. That is, light leakage is not serious in the black display, the contrast is high, and the visual characteristics are good.

EXPERIMENTAL EXAMPLE 4

Figure 8:
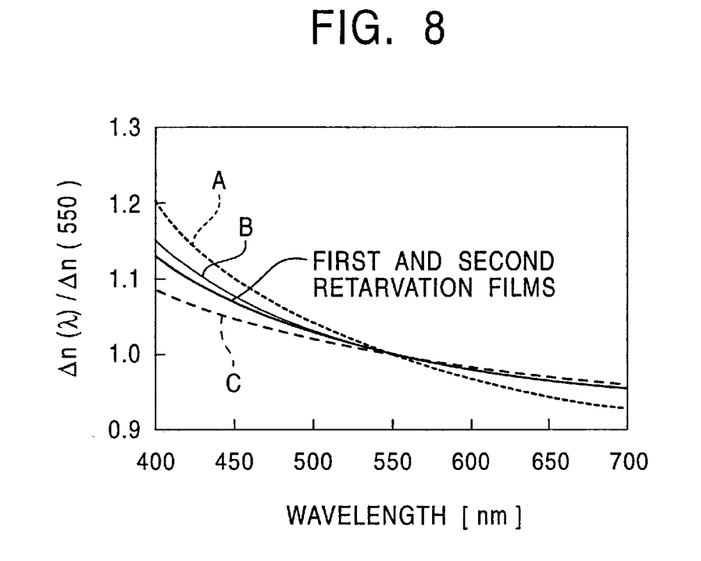
FIG. 8 is a graph showing the wavelength dispersion characteristic of $\Delta n_{LC}$ of liquid crystals A, B, and C and the wavelength dispersion characteristics of $\Delta n_{RF1}$ and $\Delta n_{RF2}$ of the first and second retardation films.

A reflective liquid crystal display device (third embodiment) of a normally black display type was produced, which had the same configuration as that of the liquid crystal display device used in the above Experimental Example 1, except that $\Delta nd_{LC}$ of a liquid crystal cell was 820 nm (measured wavelength: 589 nm), $\Delta nd_{RF1}$ of a first retardation film was 250 nm, the angle $\phi_{RF1}$ formed by RF$_1$ of the first retardation film with respect to the normal direction X was 96.5°, $\Delta nd_{RF2}$ of a second retardation film was 375 nm, the angle $\phi_{RF2}$ formed by RF$_2$ of the second retardation film with respect to the normal direction X was 160.5°, and the angle $\phi_{Pol}$ formed by Pol of the polarizing plate with respect to the normal direction X was 115.5°, and that $\Delta n_{LC}$ of liquid crystal in the liquid crystal layer exhibited the wavelength dispersion characteristic shown by the curve A in FIG. 8.

A reflective liquid crystal display device (fourth embodiment) of a normally black display type was produced, which had the same configuration as that of the liquid crystal display device used in the above Experimental Example 1, except that $\Delta nd_{LC}$ of the liquid crystal cell was 820 nm (measured wavelength: 589 nm), $\Delta nd_{RF1}$ of the first retardation film was 245 nm, the angle $\phi_{RF1}$ formed by $RF_1$ of the first retardation film with respect to the normal direction X was 107°, $\Delta nd_{RF2}$ of the second retardation film was 375 nm, the angle $\phi_{RF2}$ formed by $RF_2$ of the second retardation film with respect to the normal direction X was 161.5°, and the angle $\phi_{Pol}$ formed by Pol of the polarizing plate with respect to the normal direction X was 107.5°, and that $\Delta n_{LC}$ of liquid crystal in the liquid crystal layer exhibited the wavelength dispersion characteristic shown by the curve B in FIG. 8.

A reflective liquid crystal display device (fifth embodiment) of a normally black display type was produced, which had the same configuration as that of the liquid crystal display device used in the above Experimental Example 1, except that $\Delta nd_{LC}$ of the liquid crystal cell was 820 nm (measured wavelength: 589 nm), $\Delta nd_{RF1}$ of the first retardation film was 250 nm, the angle $\phi_{RF1}$ formed by $RF_1$ of the first retardation film with respect to the normal direction X was 97°, $\Delta nd_{RF2}$ of the second retardation film was 375 nm, the angle $\phi_{RF2}$ formed by $RF_2$ of the second retardation film with respect to the normal direction X was 157°, and the angle $\phi_{Pol}$ formed by Pol of the polarizing plate with respect to the normal direction X was 109.5°, and that $\Delta n_{LC}$ of liquid crystal in the liquid crystal layer exhibited the wavelength dispersion characteristic shown by the curve C in FIG. 8.

In the third to fifth embodiments, the duty ratio of the liquid crystal cell was 1:240, the bias ratio was 1:13, and the twist angle of liquid crystal was 240°.

FIG. 8 shows the wavelength dispersion characteristics of $\Delta n_{LC}$ of the liquid crystals A, B, and C, and the wavelength dispersion characteristics of $\Delta n_{RF1}$ and $\Delta n_{RF2}$ of first and second retardation films used herein. The vertical axis indicates $\Delta n(\lambda)/\Delta n(550)$ that is obtained by dividing birefringences of the liquid crystal and the first and second retardation films with respect to wavelengths by a birefringence of 550 nm.

Figure 9:
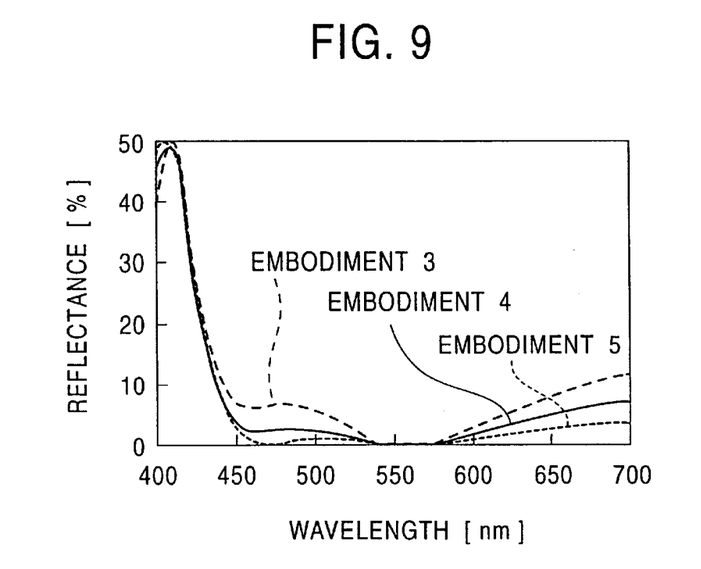
FIG. 9 is a graph showing spectral reflectance characteristics in a black display state of reflective liquid crystal display devices according to third, fourth and fifth embodiments.

Examinations were made of spectral reflectance characteristics in a black display state of the produced reflective liquid crystal devices of the third to fifth embodiments. The examination results are shown in FIG. 9.

As the results in FIG. 8 show, the reflectance of the fifth embodiment including the liquid crystal C, which has a wavelength dispersion characteristic of $\Delta n_{LC}$ less than the wavelength dispersion characteristics of $\Delta n_{RF1}$ and $\Delta n_{RF2}$ of the first and second retardation films, is closer to 0 than those of the third and fourth embodiments including liquid crystals having wavelength dispersion characteristics of $\Delta n_{LC}$ greater than the wavelength dispersion characteristics of $\Delta n_{RF1}$ and $\Delta n_{RF2}$ of the first and second retardation films, which achieves a good black display state. This reveals that high contrast can be obtained by using a liquid crystal having a wavelength dispersion characteristic of $\Delta n_{LC}$ less than the wavelength dispersion characteristics of $\Delta n_{RF1}$ and $\Delta n_{RF2}$ of the first and second retardation films.

EXPERIMENTAL EXAMPLE 5

Reflective liquid crystal display devices of a normally black display type (Sample Nos. 50 to 58) were produced, which had the same configuration as that of the liquid crystal display device used in the above Experimental Example 1, except that $\Delta nd_{LC}$ of the liquid crystal cell was 828.1 nm (measured wavelength: 589 nm), $\Delta nd_{RF1}$ of the first retardation film was 250 nm, the angle $\phi_{RF1}$ formed by $RF_1$ of the first retardation film with respect to the normal direction X was 97°, $N_z$ of the first retardation film was set as shown in the following Table 5, $\Delta nd_{RF2}$ of the second retardation film was 375 nm, the angle $\phi_{RF2}$ formed by $RF_2$ of the second retardation film with respect to the normal direction X was 157.0°, $N_z$ of the second retardation film was set as shown in the following Table 5, and the angle $\phi_{Pol}$ formed by Pol of the polarizing plate with respect to the normal direction X was 109.5°.

For comparison, reflective liquid crystal display devices of a normally black display type (Sample Nos. 59 to 62) were produced, which had the same configuration as that of the liquid crystal display device used in the above Experimental Example 1, except that $\Delta nd_{LC}$ of the liquid crystal cell was 828.1 nm (measured wavelength: 589 nm), $\Delta nd_{RF1}$ of a first retardation film was 250 nm, the angle $\phi_{RF1}$ formed by $RF_1$ of the first retardation film with respect to the normal direction X was 97°, $N_z$ of the first retardation film was set as shown in the following Table 6, $\Delta nd_{RF2}$ of the second retardation film was 375 nm, the angle $\phi_{RF2}$ formed by $RF_2$ of the second retardation film with respect to the normal direction X was 157.0°, $N_z$ of the second retardation film was set as shown in the following Table 6, and the angle $\phi_{Pol}$ formed by Pol of the polarizing plate with respect to the normal direction X was 109.5°.

The display characteristics of the liquid crystal display devices, Sample Nos. 50 to 62 were examined in the following way.

That is, the light source, the polarizing plate, the second retardation film, the first retardation film, the liquid crystal cell, and the reflection plate were placed in that order. Light was incident on the liquid crystal cell at an azimuth angle of 180° from the Z-direction shown in FIG. 1 (in the direction of −30°, from directly above), and reflected light in the Z-direction was received at a receiving angle of 30°. In this case, CR (contrast) in the direction of the polar angle was examined in a white display state in the normally black mode (N/B). The results are shown in the following Tables 5 and 6:

TABLE 5

| Sample No. | $N_z$ Co-Efficient of Second Retardation Film | $N_z$ Co-Efficient of First Retardation Film | Contrast Azimuth 0° | Azimuth 45° | Azimuth 90° | Azimuth 135° |
|---|---|---|---|---|---|---|
| 50 | 0.1 | −0.5 | 5.7960 | 10.6173 | 3.0487 | 7.7776 |
| 51 | 0.1 | −0.1 | 9.3514 | 9.7563 | 4.8023 | 8.5194 |
| 52 | 0.1 | 0.5 | 17.8986 | 8.3539 | 10.3848 | 9.0527 |
| 53 | 0.1 | 1.0 | 11.7226 | 7.2168 | 16.3350 | 8.9278 |
| 54 | 0.1 | 1.5 | 4.8534 | 6.1660 | 14.1036 | 8.3165 |
| 55 | 0.1 | 2.0 | 2.3603 | 5.2316 | 8.7300 | 7.4297 |
| 56 | −0.5 | 0.5 | 18.7971 | 5.1006 | 3.2849 | 25.1979 |
| 57 | 0.5 | 0.5 | 5.9352 | 7.2998 | 20.3535 | 4.2921 |
| 58 | 0.9 | 0.5 | 2.1953 | 5.4898 | 21.4019 | 2.3008 |

TABLE 6

| Sample No. | $N_z$ Co-Efficient of Second Retardation Film | $N_z$ Co-Efficient of First Retardation Film | Contrast Azimuth 0° | Contrast Azimuth 45° | Contrast Azimuth 90° | Contrast Azimuth 135° |
|---|---|---|---|---|---|---|
| 59 | 0.1 | −1.0 | 3.6695 | 11.4039 | 1.9131 | 6.6421 |
| 60 | 0.1 | 2.5 | 1.4153 | 4.3979 | 5.5070 | 6.5214 |
| 61 | −0.1 | 0.5 | 7.8369 | 2.1473 | 1.4520 | 18.6115 |
| 62 | 1.0 | 0.5 | 1.7557 | 5.0945 | 19.5446 | 2.0019 |

The results shown in Tables 5 and 6 reveal that Samples Nos. 50 to 58, in which the values $N_z$ of the first and second retardation films are within the ranges of the present invention, provide a larger high-contrast region of the display plane in the vertical and horizontal directions, a wider angle of view of the display plane in the vertical and horizontal directions, and better visual characteristics, than those of Sample Nos. 59 to 62 in which the values $N_z$ of the first and second retardation films are out of the ranges of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A reflective liquid crystal display device, wherein a transparent electrode and an alignment layer are placed in that order on an inner side of one of a pair of transparent substrates positioned on opposite sides of a liquid crystal layer in a liquid crystal cell of a normally black display type, a transparent electrode and an alignment layer are placed in that order on an inner side of the other transparent substrate, and two retardation films and a polarizing plate are placed in that order on an outer side of said other transparent substrate in said liquid crystal cell, wherein a retardation $\Delta nd_{LC}$ of said liquid crystal cell ranges from 705 nm to 890 nm, and wherein, when an alignment direction a of said alignment layer on the side of said other transparent substrate and an alignment direction b of said alignment layer on the side of said one of said transparent substrates are viewed from the light incident side, and the direction between the alignment directions a and b that bisects the interior angle, which is formed by an intersection O of the alignment directions a and b, and the alignment directions a and b, is designated a normal direction X, a retardation $\Delta nd_{RF1}$ of said retardation film adjacent to said other transparent substrate ranges from 195 nm to 280 nm, an angle $\phi_{RF1}$ formed by a delayed phase axis of said retardation film with respect to the normal direction X ranges from 75° to 115°, counterclockwise, as viewed from the light incident side, a retardation $\Delta nd_{RF2}$ of said retardation film adjacent to said polarizing plate ranges from 310 nm to 415 nm, an angle $\phi_{RF2}$ formed by a delayed phase axis of said retardation film with respect to the normal direction X ranges from 130° to 180°, counterclockwise, as viewed from the light incident side, and an angle $\phi_{Pol}$ formed by an absorption axis of said polarizing plate with respect to the normal direction X ranges from 80° to 130° or 170° to 220°, counterclockwise, as viewed from the light incident side.

2. A reflective liquid crystal display device according to claim 1, wherein a coefficient $N_Z$ given by the following equation (1), of said retardation film adjacent to said other transparent substrate is within the range of −0.5 to 2.0, and a coefficient $N_Z$ of said retardation film adjacent to said polarizing plate is within the range of −0.5 to 0.9:

$$N_z = (n_x - n_z)/(n_x - n_y) \quad (1)$$

where $n_x$ is the refractive index in the X-axis direction of said retardation film, $n_y$ is the refractive index in the Y-axis direction, and $n_z$ is the refractive index in the Z-axis direction.

3. A reflective liquid crystal display device according to claim 2, wherein liquid crystal forming said liquid crystal layer has a wavelength dispersion characteristic of the birefringence $\Delta n_{LC}$ less than the wavelength dispersion characteristics of the birefringence $\Delta n_{RF1}$ of said retardation film adjacent to said other transparent substrate and the birefringence $\Delta n_{RF2}$ of said retardation film adjacent to said polarizing plate.

4. A reflective liquid crystal display device according to claim 1 wherein liquid crystal forming said liquid crystal layer has a wavelength dispersion characteristic of the birefringence $\Delta n_{LC}$ less than the wavelength dispersion characteristics of the birefringence $\Delta n_{RF1}$ of said retardation film adjacent to said other transparent substrate and the birefringence $\Delta n_{RF2}$ of said retardation film adjacent to said polarizing plate.

5. A reflective liquid crystal display device, wherein a transparent electrode and an alignment layer are placed in that order on an inner side of one of a pair of transparent substrates positioned on opposite sides of a liquid crystal layer in a liquid crystal cell of a normally white display type, a transparent electrode and an alignment layer are placed in that order on an inner side of the other transparent substrate, and two retardation films and a polarizing plate are placed in that order on an outer side of said other transparent substrate of said liquid crystal cell, wherein a retardation $\Delta nd_{LC}$ of said liquid crystal cell ranges from 705 nm to 1250 nm, and wherein, when an alignment direction a of said alignment layer on the side of said other transparent substrate and an alignment direction b of said alignment layer on the side of said one of said transparent substrates are viewed from the light incident side, and the direction between the alignment directions a and b that bisects the interior angle, which is formed by an intersection O of the alignment directions a and b, and the alignment directions a and b, is designated a normal direction X, a retardation $\Delta nd_{RF1}$ of said retardation film adjacent to said other transparent substrate ranges from 115 nm to 250 nm, an angle $\phi_{RF1}$ formed by a delayed phase axis of said retardation film with respect to the normal direction X ranges from 65° to 95°, counterclockwise, as viewed from the light incident side, a retardation $\Delta nd_{RF2}$ of said retardation film adjacent to said polarizing plate ranges from 255 nm to 365 nm, an angle $\phi_{RF2}$ formed by a delayed phase axis of said retardation film with respect to the normal direction X ranges from 105° to 145°, counterclockwise, as viewed from the light incident side, and an angle $\phi_{Pol}$ formed by an absorption axis of said polarizing plate with respect to the normal direction X ranges from 60° to 95° or 150° to 185° counterclockwise, as viewed from the light incident side.

* * * * *

UNITED STATES PATENT AND TRADEMARK OFFICE
CERTIFICATE OF CORRECTION

PATENT NO. : 6,219,122 B1
DATED : April 17, 2001
INVENTOR(S) : Tatsuo Uchida et al.

It is certified that error appears in the above-identified patent and that said Letters Patent is hereby corrected as shown below:

Claim 1,
Line 30, delete "$\phi_{Pol}$" and substitute -- $\phi_{Po1}$ -- in its place.

Claim 2,
Line 2, immediately after "Nz" insert -- , -- (comma).
Line 9, before "(1)" insert -- . . . --.

Claim 4,
Line 2, immediately after "claim 1" insert -- , -- (comma).

Claim 5,
Line 30, delete "$\phi_{Pol}$" and substitute -- $\phi_{Po1}$ -- in its place.

Signed and Sealed this

Twenty-sixth Day of March, 2002

Attest:

*Attesting Officer*

JAMES E. ROGAN
*Director of the United States Patent and Trademark Office*